United States Patent [19]

Kobold

[11] Patent Number: 4,567,777
[45] Date of Patent: Feb. 4, 1986

[54] DEVICE FOR MEASURING THE THROUGHFLOW OF LIQUIDS AND GASES

[76] Inventor: Klaus Kobold, Sodener Str. 120, D-6233 Kelkheim, Fed. Rep. of Germany

[21] Appl. No.: 510,220

[22] Filed: Jul. 1, 1983

[30] Foreign Application Priority Data

Sep. 17, 1982 [DE] Fed. Rep. of Germany ... 8226199[U]

[51] Int. Cl.$^4$ .............................................. G01F 1/24
[52] U.S. Cl. .............................. 73/861.54; 73/861.56; 200/294
[58] Field of Search ........... 73/861.55, 861.56, 861.54; 200/81.9 M, 82 E, 294, 296

[56] References Cited

U.S. PATENT DOCUMENTS

| | | | |
|---|---|---|---|
| 2,628,297 | 2/1953 | Grauer | 200/81.9 M |
| 3,137,165 | 6/1964 | Harris | 73/861.56 |
| 3,398,249 | 8/1968 | Dessert | 200/294 |
| 3,766,779 | 10/1973 | Hoffman | 200/81.9 M X |

FOREIGN PATENT DOCUMENTS 939539  2/1956  Fed. Rep. of Germany ... 73/861.75

Primary Examiner—Charles Hart
Attorney, Agent, or Firm—Keil & Weinkauf

[57] ABSTRACT

Device for throughflow measurement of gases or liquids according to the suspension principle, with a suspension element in the housing and special design of the housing, the attached indicator device, and the switch, said switch being activated by the suspension element when the predetermined throughflow volume is reached. The reverse side of the housing (1) of the flowmeter displays a contact surface for attachment rails; these rails connect the switch to the housing by way of a cavity between the rails, into which a T-shaped rail, attached to a base plate on a switch part, is inserted. The housing (19) of the indicator device (4) is positioned to the side of the housing (1) of the flowmeter and is screwed to the latter and secured to the flowmeter housing (1) with two attachments collars (18) inserted into a slot between the housing wall and the attachment rails.

6 Claims, 10 Drawing Figures

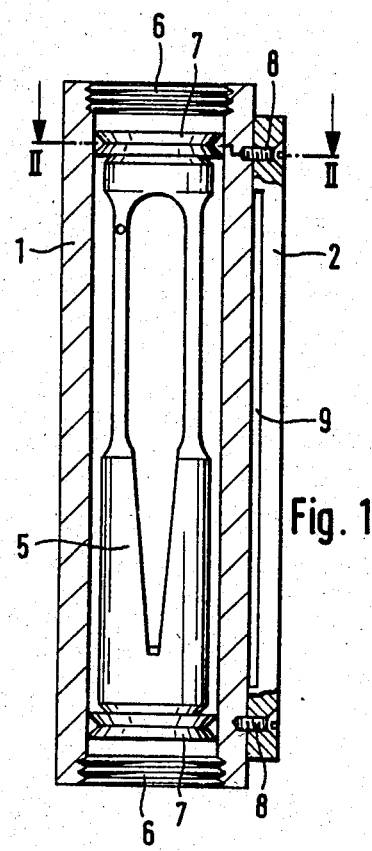
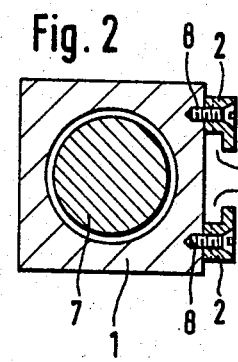
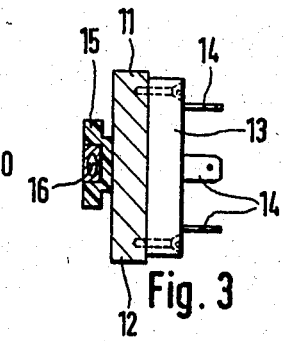
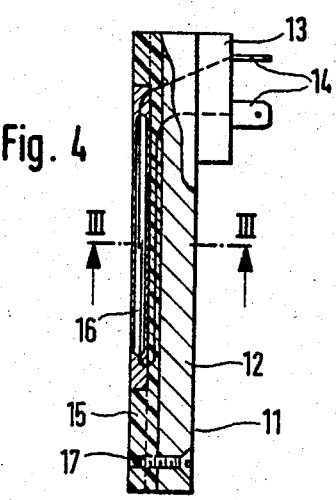

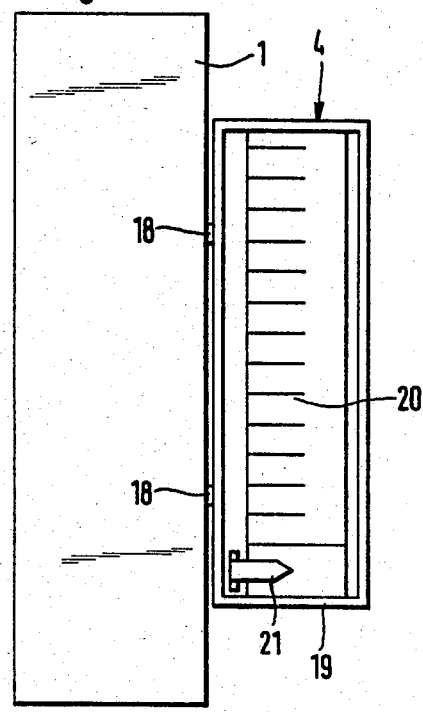
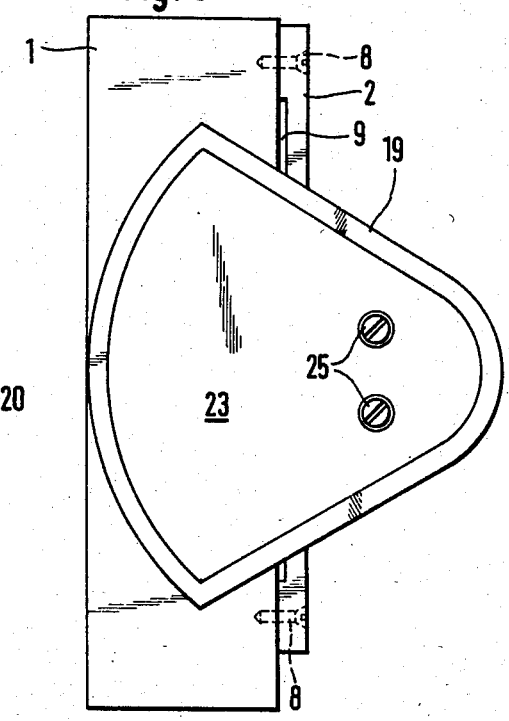
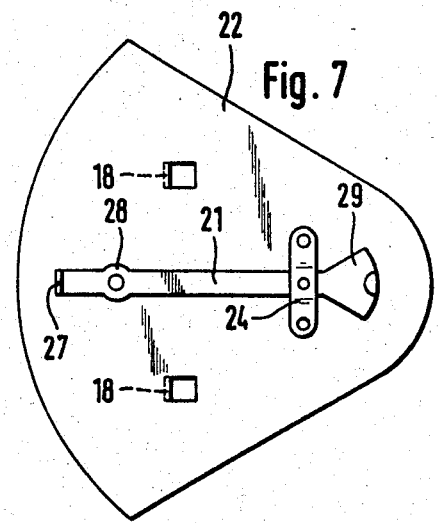
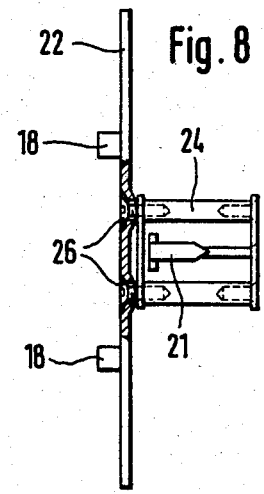

DEVICE FOR MEASURING THE THROUGHFLOW OF LIQUIDS AND GASES

The object of the invention is a device for measuring the throughflow of liquids or gases according to the suspension principle, particularly the design of the housing, of the attached indicator device, and of a switch which is activated by the suspension element when a preset throughflow volume is reached.

Numerous devices for measuring or monitoring flowing liquids and gases are known in which a measuring element suspended in the flow to be measured activates an indicator device. The measuring zone can consist of transparent material, thus allowing optical control of the measured point, or the suspended body can contain a magnet, which in a given position activates a switch positioned laterally beside the measuring zone and thereby gives off a signal. In order to obtain precise and reproducible measurements in the case of brief sliding or shifting of the suspended element, the latter is positioned in a cylindrically formed cage, in such a manner as to allow it a certain axial play. The form of the cage is such that the flow initially has available to it a narrow sectional area between the suspended element and the cage wall or housing wall of the measuring zone. When the suspended element or measuring element is lifted by the increasing throughflow, the sectional area increases, so that the height of lift decreases. This makes it possible to shorten the structural length of the measuring device.

The known devices have various drawbacks, however. Measuring zones of transparent material, e.g. glass, are undesirable today for reasons of safety and the danger of breaking, and are no longer even permitted in certain applications. All-metal casings improve the situation somewhat, but require devices which do not display the position of the measuring element. Designs of this type are known, but have a costly and expensive construction.

The objective of the present invention is to create a structural design for a throughflow measuring device which consists of a measuring device with an indicator and a contact switch, the individual parts of which can be combined in simple fashion according to the mechanical assembly technique and can be adapted with various measuring areas and to differing measuring problems without great difficulty.

This objective is achieved by a device for the throughflow measurement of gases and liquids according to the suspension principle, with suspended elements in the housing and an indicator and a movable contact switch attached outside of the housing. The characteristic features of the invention are a flowmeter housing (1) of metal or plastic, on the reverse side of which there is a contact surface for attachment rails (2); two L-shaped attachment rails (2) positioned at a certain distance from each other on the reverse side of the housing; a T-shaped rail inserted in a cavity (10) between the rails (2) and secured to a base plate (12) of a switch part (11); and the housing (19) of the indicator device (4) beside the housing (1) of the flowmeter, which housing (19) is secured to the housing (1) by means of a clamp or screws.

The secondary claims describe preferred forms of the invention. To achieve the invention objective, three elements comprising the measuring devices—the actual flowmeter, the indicator device, and the switch part—are combined in special fashion. The switch part is movably attached in the longitudinal direction to the reverse side of the flowmeter housing to allow the switch point of the desired throughflow volume to be suitably adjusted. The switch part is secured to the back of the housing by means of attachment rails and a locking screw, in a position such that the protective gas contact switch positioned in the switch part is triggered by an axially magnetized magnet located within the measuring element, in accordance with the height of lift of the measuring element. The height of lift of the measuring element in the housing is limited structurally, i.e. by the design of the cage or other inserted parts, such that bistable switching is possible, with the result that when a certain height of lift is achieved, the contact, closed by magnetic force, remains closed until the height of lift of the measuring element drops below the intended value, as determined by a reduced throughflow.

The preferred form of the flowmeter housing is quadralateral or rectangular. The housing can be produced from metal or plastic.

The L-shaped attachment rails are each secured to the contact surface of the back wall of the housing with two countersunk screws, in such a way that the longer shanks do not rest against the housing wall, but face each other without their ends touching, with the result that between the housing wall and the inside of the rails a cavity is formed, which is open between the facing shank ends.

The shank of either or both attachment rails resting on the wall of the housing (1) displays a longitudinal groove, so that a slot is formed between the housing wall and the attachment rails. The longitudinal groove on the shanks terminates at a distance of 10 to 20 mm from the shank ends, and boreholes are applied to the thicker shank ends to receive the attachment screws for the rails. The contact surface of the housing wall on the reverse side of the flowmeter displays 4 tapholes, which are arranged in pairs above and below the ends to secure the attachment rails to the housing with countersunk screws.

The switch part consists of a rectangular base plate, attached to one side of which is a T-rail or crosspiece and to the opposite side an insulating plate with the connection contacts for the protective gas contact switch. The transverse of the T-shaped rail does not rest on the base plate, so that the T-section can be inserted into the cavity (10) formed by the L-shaped attachment rails on the back of the housing. In the vicinity of the lower end of the switch part there is a taphole, which passes through the base plate and the T-rail and which receives a setscrew securing the switch part to the housing.

There is a lengthwise depression in the transverse of the T-shaped rail, into which the protective gas contact switch, a so-called Reed contact, is cast, its connections being electrically joined with the contacts in the insulating plate on the other side of the switch part.

The simply constructed switch part and its connection to the the flowmeter by means of the attachment rails make it possible to employ the same switch part for different flowmeters, the length of the attachment rails being adjusted when necessary to the differing heights of lift. For devices with a short stroke a rail length of 100–130 mm is sufficient, so that, using the mechanical assembly technique, only a reduced number of individual parts is needed, particularly since, with the symmetrical arrangement of the attachment rails, the rail length is adequate and the rails can be screwed to the shanks turned away from the housing wall, it only being necessary to turn the rails toward each other. The distance between the ends of the shanks is preferably 10–12 mm and the length of the other shank 3–8 mm, so that there is a cavity depth of 3–8, preferably 5 mm, for the transverse of the T-section of the switch part. The rails are attached with countersunk screws which penetrate the rails, so that the base plate of the switch part rests on the outside of the rails.

To render the position of the suspension element in the flowmeter visible an indicator device is positioned on the side of the housing. This can be attached with screws. Preferred, however, is an attachment collar. Here the indicator housing displays two flat attachment collars on the side facing the flowmeter, which are inserted in the slot between the housing wall and the attachment rail and which are slightly thicker than the slot, so that when the attachment rail screws are tightened the collars are pressed into the slot, in this simple fashion providing a firm attachment for the indicator device, which can nonetheless be adapted to the height of the flowmeter.

The indicator housing consists of a frame-shaped middle section of transparent material, preferably plastic, such as polycarbonate or acrylic glass, and two side plates of metal. The flat attachment collars are formed by cutting a rectangular or quadralateral portion, bending outward on a lateral surface, from each of the side plates. The slot between the housing wall and the attachment rail is slightly more narrow than the thickness of the metal plates of the side wall of the indicator device housing. Each of the two side rims of the frame-shaped middle portion of the housing displays a step into which the side plates can be inserted. Between the side plates within the housing an indicator frame with the indicator device is attached by means of the screws passing through boreholes in the side plates. The indicator frame has the usual construction, with the indicator axis running between two base plates, which are held apart by casings. The indicator has a ferritic part or is else is entirely ferritic. Its point is rounded off on its front side within the housing and has a scale on its side at a distance from the front. There is a counterbalance on the back of the indicator. The ferritic indicator, or its ferritic portion, is magnetically coupled with the axially magnetized magnet within the measuring element, so that the indicator will be lifted with the measuring element, as determined by the flow, and the deflected end will allow the scale to be read. The front side of the housing has a curved form; at a distance from it a scale with a corresponding curvature is inserted in a slot. For different measuring ranges the scales need only be exchanged, the possible longitudinal displacement of the attachment nipple within the slot making possible the variable positioning in the vertical direction of the indicator on the flowmeter, so that adjustment can be made for differing ranges and measuring element positions within the flowmeter. The easily constructed and secured indicator can be employed for different flowmeters according to the mechanical assembly technique, the structural form of the attachment making it possible to adjust the position of the indicator point relative to the measuring element position within the flowmeter.

The invention will be more closely described on the basis of diagrams which show an invention embodiment.

FIG. 1 shows a part of the device from the side, in a longitudinal section.

FIG. 2 shows the same part in a cross-section along II—II from FIG. 1, the position and form of the attachment rails being particularly clear.

FIG. 3 shows the switch part from above, in section III—III from FIG. 4.

FIG. 4 shows a longitudinal section of the switch part from the side.

FIG. 5 shows the structural form of the device from the front, with the indicator device positioned at the side.

FIG. 6 shows the device as shown in FIG. 5, but from the side.

FIG. 7 shows a top view of the side plate of the indicator from the top.

FIG. 8 shows the side plate with screwed in indicator frame from the front.

Figure 9:
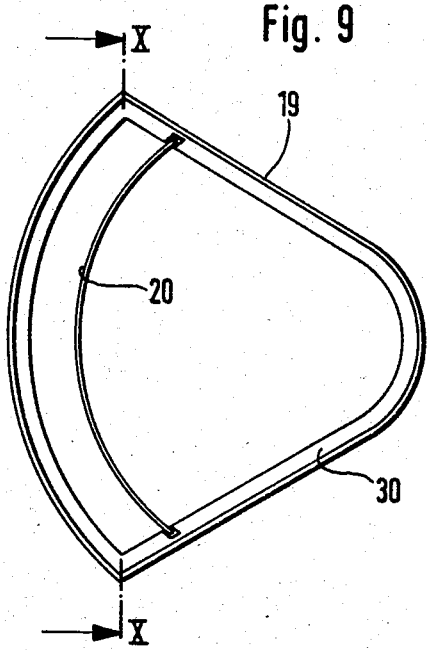
FIG. 9 shows the middle portion of the indicator housing, with its side cover plate removed.

FIG. 1 shows the all-metal housing 1 of the measuring device, in a lengthwise section from the side, with the attachment rails 2, screwed onto the reverse side, for the protective gas contact switch 3, 16 and the indicator device 4. Within the housing 1 is the case 5 to contain the measuring element. The ends of the housing display internal threads 6 for screwing in the connection lines. The cage within the housing is fixed in its position by two insert rings. Each of the two attachment rails 2 is attached with 2 countersunk screws (above and below) to the housing. Between one or both rails 2 and the back wall of the housing there is a slot 9 for the housing attachment collars 10. The depth of the slot between the housing 1 and the rail 2 is somewhat less than the thickness of the attachment collar 18, so that by tightening the screws 8, the indicator device 4 can be firmly positioned on the housing, the attachment collars 18 being fastened between the housing wall and the attachment rails 1. The slot 9 is produced by a recess or groove of appropriate depth in the side of the rails 2 facing the housing 1. Only at the two ends does the shank of the L-shaped rail rest on the housing surface, to be attached there with screws 8. The corresponding boreholes are applied to the wall of the housing 1.

FIG. 2 shows the arrangement of the two attachment rails 2 on the housing (1), in a section along II—II from FIG. 1. The two rails (2) are L-shaped in form and are attached with screws (8) to the housing and lie parallel to each other and to the longitudinal edges of the housing. The parallel shanks of the attachment rails (2) are turned toward each other and are separated by a certain distance. The switch part (11) shown in FIG. 3 can be inserted in the cavity (10) thus formed.

The switch part (11) shown in section III—III in FIG. 3 consists of a base plate (12), on to which an insulating plate (13), along with insulated plug sockets (14), are screwed. A T-shaped crosspiece or rail is secured to the other side of the base plate (12) with screws. The size of the transverse of the T is such that it fits into the cavity 10 between the attachment rails 2, and the width of the straight piece of the T secured to the base plate 12 is such that it fills the space between the facing shanks of the rails 2 with little play; the T-shaped rail 15 can be inserted into the cavity 10. A protective gas contact, a so-called Reed contact, is cast into a groove running lengthwise in the transverse of the T-rail. The ends of the switch 16 are attached to the connection contacts 14 to form an electric connection by way of insulated wires. The longitudinal section of the switch part 12 shown from the side indicates the position of the protection gas contact switch in the groove of the transverse of the T-shaped crosspiece and the wire conection to the connection contacts 14. At its lower end the switch part 11 displays a threaded bore 17, whose purpose is to secure the switch part 11 to the wall of the housing 1 by means of a countersunk screw, which in secured position presses against the wall of the housing 1. The contact of the protective gas contact switch 16 is closed as soon as the flowmeter measuring element within the housing rests at the same level as the contact ends. The closing contact is produced by an axially magnetized magnet within the measuring element. The position of the switch part 11 on the housing wall is such that the desired switching point is assured, in accordance with the height of lift. The structural form of the flowmeter within the housing 1 is such that bistable switching is assured, and the lift of the measuring element is limited so that if the desired value is exceeded, the magnetic effect on the protective gas contact switch 16 is maintained and the switch is only opened when the height of lift of the measuring element drops below the desired value due to a corresponding decrease in the throughflow volume. The longitudinal section of the switch part 11 is shown in FIG. 4.

FIG. 5 shows how the indicator device 4 on the side of the housing 1 of the flowmeter is mounted with two attachment collars 18, which insert in the slot 9 between the housing 1 and the attachment rail 2. The indicator device displays a housing 19 (frame-shaped middle part) with a transparent front, which is preferably produced from plastic (polycarbonate or acrylic glass or the like). At a distance from the front wall of the housing a scale is positioned within such that it is covered by the offset point 27 of the indicator 21, making it possible to the read the indicator position on the scale. FIG. 6 shows the same object as FIG. 5, rotated 90°, from the side. The attachment rails 2 are secured with screws 8 to the housing 1 of the flowmeter. The indicator device 4 is fastened in the slot 9 by means of the attachment nipple 18, which extends from the side plate 22 of the housing 19 and is not shown in the figure. The other side of the housing of the indicator device 4 is a side plate with 2 boreholes. Screws 25 are inserted in the boreholes and screwed in the thread of the indicator 24 to secure the second side plate 23.

FIGS. 7 and 8 show the other side plate 22, with the indicator frame attached on top of it. The attachment collars 18 are formed by cutting, pushing out, and offsetting a rectangular or quadralateral portion from the metal side plate 22. The indicator 21 has a point 27 that is curved around the scale, and has either a ferritic part 28 or is entirely ferritic; at the other end is a counterbalance 29.

Figure 10:
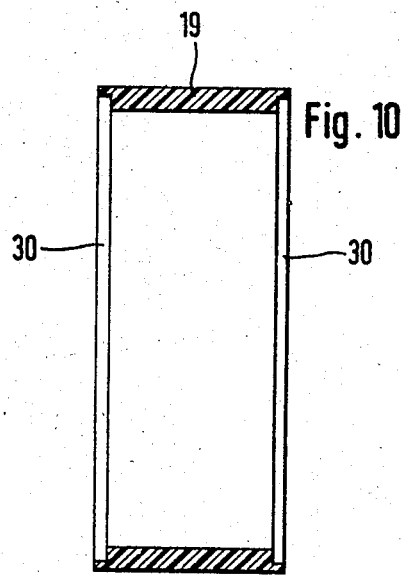
FIG. 10 shows a section along X—X of FIG. 9.

FIGS. 9 and 10 show the frame-shaped middle piece of the indicator device housing 19 from the side, with the lateral cover plate removed, and from the front without the side plates 22, 23. The inside of the rim is provided with a step to receive the side plates 22, 23. This provides for a sunken arrangement of the side plates 22, 23 and a smooth side surface joining with the frame-shaped middle portion of the housing. The area around the boreholes in the side plates for the attachment screws of the indicator frame is flattened somewhat toward the inside of the housing so that the head of the attachment screws 25, 26 can be received in the countersink. The scale 20 is inserted in slots on the inside of the frame-shaped portion of the housing and is curved to match the curved front of the frame-shaped middle part. A certain distance separates the scale from the side wall 23 of the housing 19 to receive the indicator and allow the bent point 27 of the indicator to span the scale.

The indicator device 4 is attached to the flowmeter housing 1 in a position such that the indicator 21, which is lifted and moved by the measuring element magnet due to the latter's effect on the ferritic indicator or the ferritic part 28 of the indicator, shows the throughflow volume corresponding to the position of the measuring element. Given the easily replaced scale, the adjustment capability of the indicator device 4, and the replacement, when necessary, of the measuring element, the device can be easily adapted to differing measuring zones; the individual parts of the device can be easily assembled according to the mechanical assembly technique, and only a few parts need be replaced for differing measuring problems. The indicator device basically has the same form for all types of display, thus considerably simplifying production and storage.

The structural design of the invention provides a considerable reduction in the size of the indicator device and of the switch part 11, so that the spatial requirements of the entire device, including the flowmeter, are considerably reduced.

LIST OF REFERENCE NUMERALS

1: flowmeter housing
2: attachment rails
3: protective contact switch
4: indicator device
5: cage
6: thread screw
7: insertion ring
8: countersunk screws
9: slot
10: cavity
11: switch part
12: switch part base plate
13: insulating plate
14: connection contact
15: T-shaped rail, T-shaped crosspiece
16: protective gas contact switch
17: taphole
18: attachment collar
19: housing for indicator device, frame-shaped middle portion
20: scale
21: indicator
22,23: side plates of housing 19
24: indicator frame
25,26: screw
27: offset indicator point
28: ferritic part of indicator
29: counterbalance
30: step in frame-shaped housing part

I claim:
1. Device for throughflow measurement of gases or liquids according to the principle of suspension, with a suspension element positioned in the housing, an indicator device secured outside of the housing, and an adjustable contact switch, wherein the metal or plastic housing (1) of the flowmeter displays a contact surface for attachment rails on its reverse side, which attachment rails (2) are L- shaped and separated from each other by a certain distance and are secured to the wall of said housing by means of two countersunk screws (8) in such a way that the shanks do not rest on said housing wall, but face each other without their ends touching, so that the cavity (10) between said housing wall and the inside of said rails between the facing shank ends are open; and the shank of one or both of the attachment rails which shank rests against the wall of said housing displays a lengthwise groove, forming a slot (9) between said housing wall and said attachment rails;

a T-shaped rail, which is secured to the base plate (12) of a switch part (11), is inserted in a cavity (10) between the rails (2);

and the housing (19) of the indicator device (4) is positioned to the side of the housing (1) of the flowmeter and is attached to said housing (1) by means of two attachment collars (18) clamped between the housing wall and the attachment rails.

2. Device according to claim 1, wherein the lengthwise groove on the shank(s) of the rails (2) terminates at a distance of between 10 and 20 mm from the rails ends, the boreholes for the attachment screws (8) being positioned outside of the groove.

3. Device according to claim 1, wherein a protective gas contact switch (16) is cast in the transverse of the T-shaped rail (15) and an insulating plate (13) with the connection contacts (14) for the protective gas contact switch (16) is secured to the other side of the base plate (12).

4. Device according to claim 1, wherein the housing (19) of the indicator device (4) consists of a frame-shaped middle part of transparent material and two side plates (22, 23) of metal, the flat attachment collars (18) being formed by cutting and bending out a rectangular or quadralateral piece of one of the side plates (22, 23).

5. Device according to claim 4, wherein an indicator frame (24) with an indicator (21) is secured between the side plates (22, 23) within the housing (19) by means of screws (25, 26) passing through boreholes in the side plates.

6. Device according to claim 5, wherein the indicator (21) displays a ferritic part (28), an offset indicator point (27) which covers a scale (20) positioned on the front surface, and a counterbalance on its back end.

* * * * *